United States Patent [19]

Pollack

[11] Patent Number: 5,140,140
[45] Date of Patent: Aug. 18, 1992

[54] METHOD AND APPARATUS OF SUBMERGED ARC WELDING WITH ELECTRODES IN TANDEM

[76] Inventor: Alex J. Pollack, 8703 Surf Dr., Panama City, Fla. 32408

[21] Appl. No.: 613,608

[22] Filed: Nov. 15, 1990

[51] Int. Cl.⁵ .................................. B23K 9/18
[52] U.S. Cl. ........................ 219/137 PS; 219/61; 219/73
[58] Field of Search ......... 219/72, 73, 137 R, 137 PS, 219/61

[56] References Cited

U.S. PATENT DOCUMENTS

| | | |
|---|---|---|
| 2,436,387 | 2/1948 | Harter et al. . |
| 2,550,641 | 4/1951 | Harter ............................ 219/73 |
| 2,673,915 | 3/1954 | Steinert et al. . |
| 3,336,460 | 8/1967 | Hauck et al. . |
| 3,456,089 | 7/1969 | Shrubsall . |
| 3,497,667 | 2/1970 | Howlett et al. . |
| 3,859,495 | 1/1975 | Takahashi et al. . |
| 4,341,944 | 7/1982 | Breen . |
| 4,442,340 | 4/1984 | Kawabata et al. . |

FOREIGN PATENT DOCUMENTS

| | | | |
|---|---|---|---|
| 2146406 | 3/1973 | Fed. Rep. of Germany | 219/73 |
| 2452153 | 5/1976 | Fed. Rep. of Germany | 219/73 |
| 2410529 | 3/1979 | France | 219/73 |
| 56-4374 | 1/1981 | Japan | 219/72 |
| 58-125373 | 7/1983 | Japan | 219/137 R |

*Primary Examiner*—Clifford C. Shaw
*Attorney, Agent, or Firm*—Steven C. Stewart

[57] ABSTRACT

A method and apparatus for submerged arc welding using five-electrodes having direct current (DC) connected to one electrode and alternating current (AC) connected to the other four electrodes. The electrodes are aligned in a row with predetermined angles to the direction of the weld. Alternating current is supplied to the electrodes so that a 90° phase difference is applied to adjacent electrodes and a 180° phase difference is applied between alternating electrodes. With such power application and the electrical connections of the electrodes, the welding process has a more stable weld puddle that suppresses welding defects at higher speeds than previously achievable.

6 Claims, 2 Drawing Sheets

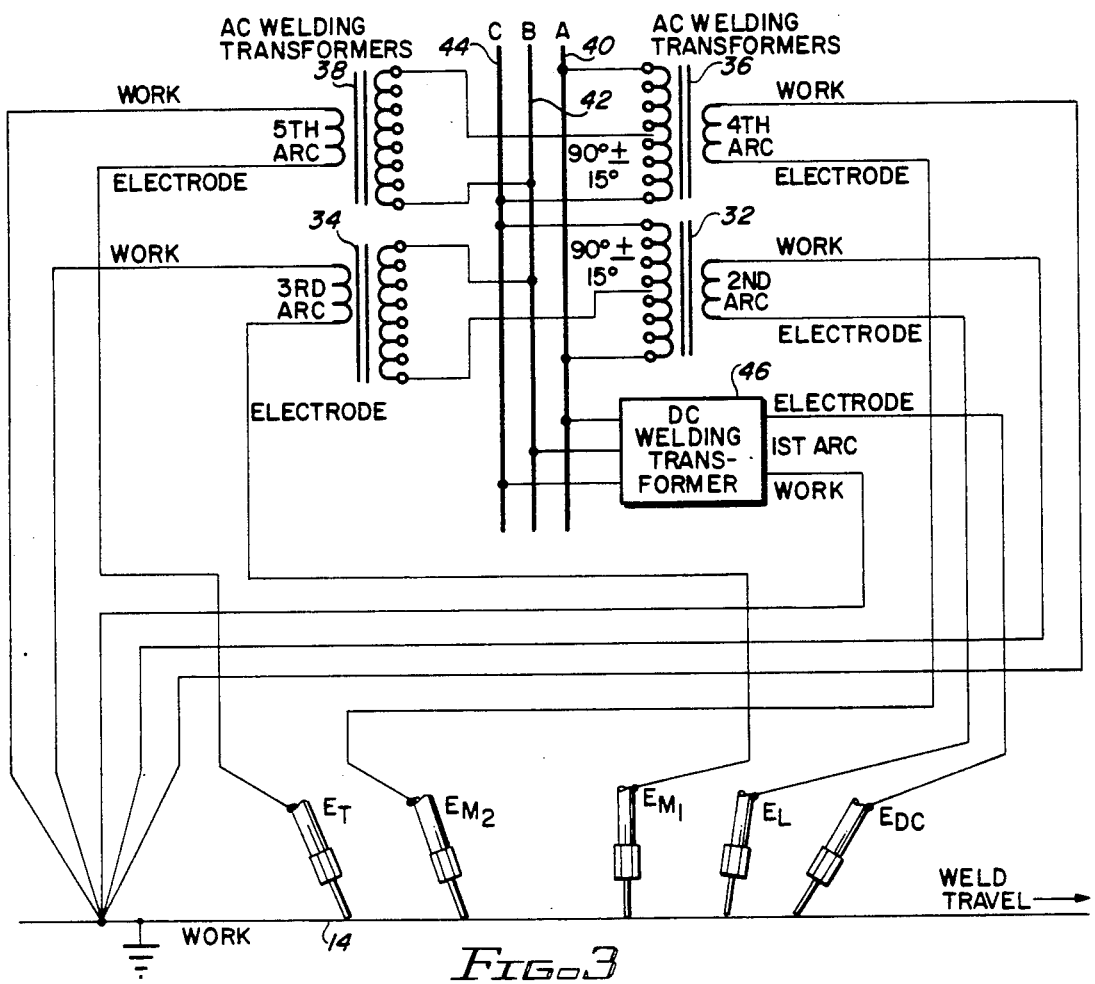
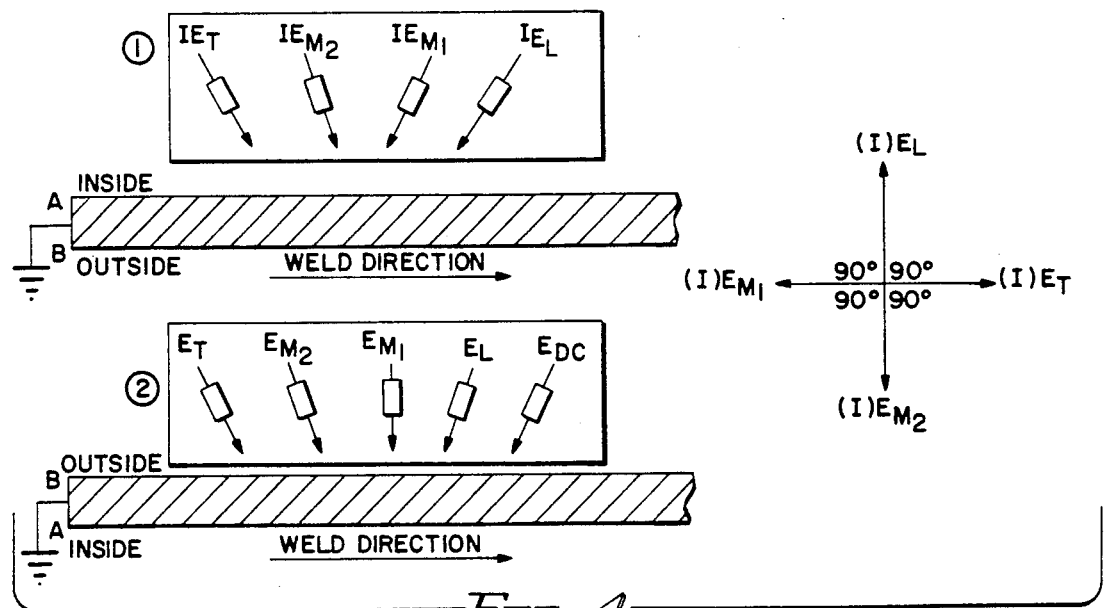

METHOD AND APPARATUS OF SUBMERGED ARC WELDING WITH ELECTRODES IN TANDEM

BACKGROUND OF THE INVENTION

This invention relates to a method and apparatus for submerged arc welding and, more particularly, to a welding process that uses four or five electrodes to efficiently manufacture large diameter steel pipes while maintaining high quality.

Large diameter steel pipes are typically formed into an O-shaped cross-section by various mechanical means. Once the pipes have been shaped it is desireable to seal the pipes' seam. One method that has been widely used to seal these seams is the submerged arc welding process. To improve the production efficiency in sealing these large diameter pipes, it is necessary to increase the speed of the submerged arc welding process because the speed relates directly to production efficiency. One method of increasing the efficiency of the welding process is using three electrodes as disclosed in U.S. Pat. Nos. 2,436,387, 3,336,460 and 3,456,089. However, the welding speeds obtained with these processes are not adequate to keep up with current demands.

As disclosed in U.S. Pat. No. 4,442,340 there are many factors which limit the welding speed, the most important of which are:

(1) insurance of sufficient penetration depth, and
(2) avoidance of welding defects.

Welding penetration is a function of welding heat input and travel speed (electric current x voltage/welding speed). To achieve adequate penetration at high speeds the electric current must be increased. Current may be increased to a point after which magnetic interaction occurs resulting in arc instability. Arc instability leads to various discontinuities; of which the most pronounced at high travel speeds is "undercutting." Undercutting is a groove melted into the base metal adjacent to the toe of the weld which is left unfilled and is generally considered to be a welding defect.

One possible solution to increase welding speed without increasing individual electrode current is by adding additional electrodes into the process. However, multi-electrodes can cause electromagnetic interference of the electric current and the ground current. Accordingly, proper phase selection between electrodes and power source is required to control the interference. Thus, if current phasing selection is not correct, welding quality decreases and high speed multi-electrode welding cannot be accomplished.

Proper angling and spacing between electrodes must be maintained so that a condition known as "arc blow" does not occur. Arc blow reduces the efficiency of the process and decreases the quality of the weld. Arc blow occurs when there is strong magnetic deflection of the arcs away from the weld puddle which is caused by undesirable magnetic interaction between the electrodes.

A process that has attempted to increase the efficiency of welding pipes is a four electrodes submerged arc welding process disclosed in U.S. Pat. No. 4,442,340. This process increases the welding speed by applying alternating current to four electrodes. The four electrodes respond to the alternating current by applying an electromagnetic force within a predetermined range that is opposite to the welding direction. A drawback to this process is that to achieve adequate penetration, higher current must be applied to the lead electrode. This may lead to imbalances with the remaining electrodes. However, the welding speed obtained by this four electrode arc welding process still does not meet the welding speeds now required.

SUMMARY OF THE INVENTION

It is an object of this invention to provide an improved submerged arc welding process having an arrangement of five electrodes in a common pool of weld metal which will prevent or suppress weld discontinuities at high welding speeds while maintaining high quality of the weld.

It is also an object of this invention to provide a five electrode welding system that uses a single DC electrode followed by a plurality of AC electrodes in line to provide a very balanced and stable weld puddle.

It is further an object of this invention to use a sole DC electrode primarily for the function of penetrating the base metal, initiating a weld while using four alternating current electrodes principally for the filling and shaping of the weld.

Another object of this invention is to arc weld by connecting direct current to one electrode and alternating current to the other electrodes to principally separate the penetration and filling functions to achieve a more efficient welding process.

It is an additional object of this invention to arc weld with a direct current electrode in combination with four balanced alternating current electrodes to obtain welding speeds exceeding 135 inches per minute.

Also an object of the invention is to submerge arc weld a pipe with an electrode supplied with direct current in line with four electrodes supplied with alternating current having a phase difference of 90°±15° between adjacent AC electrodes and 180°±30° between alternating electrodes.

It is also an object of this invention to operate five electrodes, one with direct current, and the other four electrodes with alternating currents. The power supplied to the direct current electrode is adjusted to obtain penetration of the base metal to any depth and the power supplied to the other four alternating current electrodes is maintained at substantially the same level to stabilize the weld puddle. In this manner, the four alternating current electrodes obtain the exact level of deposition required and undesired excess weld reinforcement is eliminated.

These and other objects are provided with a method of arc welding a base metal with five electrodes comprising the steps of aligning the electrodes $E_{DC}$, $E_L$, $E_{M1}$, $E_{M2}$, $E_T$ in one row from front to rear in a welding direction. The electrode $E_{DC}$ is supplied with a direct current and electrodes $E_L$, $E_{M1}$, $E_{M2}$, $E_T$ are supplied with alternating current. The power is supplied to the electrodes so that the arc from electrode $E_{DC}$ primarily penetrates the base metal initiating a weld while the arcs from the other electrodes mainly achieve the required deposition and shape the weld.

The above objects may further be practiced with a method of arc welding a base metal comprising the steps of penetrating the base metal initiating a weld with a first electrode being provided with direct current and positioning a plurality of secondary AC electrodes adjacent to the first electrode. The secondary electrodes are provided with alternating current to shape and fill the weld that was penetrated by the first electrode. It may be preferable that the secondary electrodes are positioned behind the first electrode in a row from front to back along the direction of the weld and that the alternating current is provided to the secondary electrodes maintaining a (360°/(No. of AC electrodes)) phase separation between adjacent electrodes.

The above objects may also be achieved with an apparatus for submerged arc welding a base metal comprising a plurality of arc welding electrodes positioned in a row from front to rear in a welding direction. The apparatus includes a direct current means for supplying one of the electrodes with a direct current so that an arc is generated that penetrates the base metal. An alternating current means for supplying the other electrodes is provided with alternating current so that an arc is generated that deposits a filler and shapes the weld while the electrode being provided with direct current generates an arc to penetrate the base metal.

It may be preferable that the direct current electrode is angled between 65° to 85° with respect to the welding direction and that the trailing alternating current electrode $E_T$ is angled between 110° and 135° with respect to the welding direction to maintain penetration and stability of the weld at high speeds.

BRIEF DESCRIPTION OF THE DRAWINGS

FIG. 3 illustrates a three-phase power source connection according to one embodiment of the invention; and FIG. 4 illustrates a method for welding according to an embodiment of the invention set forth in Example 3.

DESCRIPTION OF THE PREFERRED EMBODIMENTS

In most cases, the higher the welding speed the more current is required to penetrate. Increasing current results in increased magnetic interaction between the electrodes that can cause a variety of discontinuities, primarily undercutting. To prevent or suppress undercutting, it is beneficial to deflect the arc from the electrodes toward the center of the weld puddle.

Figure 1:
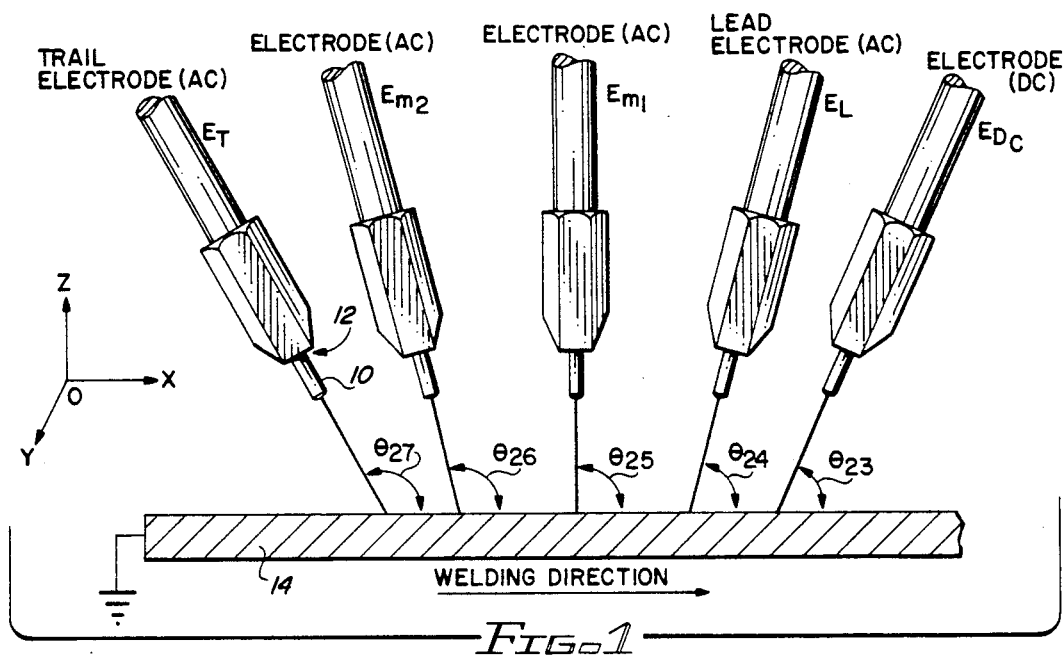
FIG. 1 is an explanatory view of the schematic model of an electrode arrangement for a five-electrode submerged arc welding process.

Referring to FIG. 1 there are shown five electrodes $E_{DC}$, $E_L$, $E_{M1}$, $E_{M2}$ and $E_T$ that are used in the submerged arc welding process. These electrodes include welding wire 10 in opposition to base metal 14. The lead electrode $E_{DC}$ is provided with direct current (DC) through a welding wire 10 and mainly performs the function of penetrating the base metal to initiate a weld. The remaining electrodes $E_L$, $E_{M1}$, $E_{M2}$ and $E_T$ are provided with alternating currents (AC) through a welding wire 10 to achieve the required fill of the weld and perform the bead shaping functions on base metal 14. It is recognized by the inventor that the highest weld stability is achieved by the separation of the penetration function, performed by electrode $E_{DC}$, from the filling and forming functions that are provided by electrodes $E_L$, $E_{M1}$, $E_{M2}$ and $E_T$. This stability allows speeds to be increased on an average of 25% over the prior art with substantially increased weld quality. The arc from AC electrodes and the DC electrode all share a common pool of weld metal. Although the arcs are contained in a common pool, each of the wires coupled to the electrodes are individually fed with separate controls.

Electrodes $E_L$, $E_{M1}$, $E_{M2}$ and $E_T$ may be connected in many current phase, interrelationships to provide different operating characteristics during submerged arc welding. Numerous relationships were tested and it was found that in the five-electrode process, optimum stability was obtained with the electrodes $E_L$, $E_{M1}$, $E_{M2}$ and $E_T$ in, a 90°±15° current phase separation between adjacent electrodes, and a 180°±30° separation between alternating electrodes. This relationship is graphed on FIG. 2. It is recognized that with this phasing relationship the power continuity of the weld puddle remains more constant compared with prior art electrode phasing combinations. It is contemplated that the reduced differential is due to minimal voltage drop between phase peaks.

Figure 2:
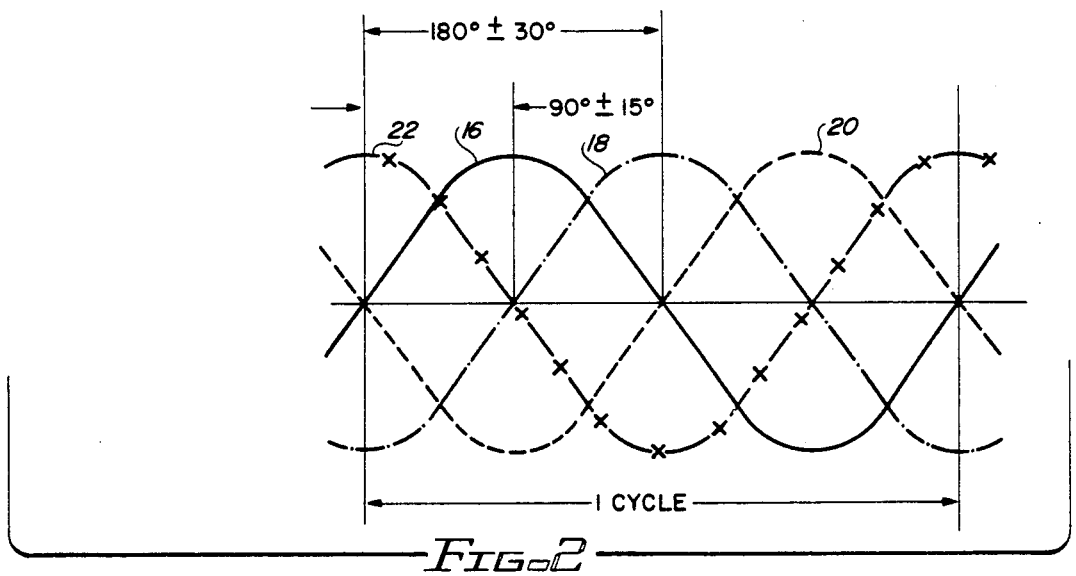
FIG. 2 illustrates the preferred phase relationship for the four alternating current electrodes used in the welding process according to the invention.

Referring to FIG. 2 there is shown the phasing relationships between the various electrodes. Sine wave 16 corresponds to a sample sine wave of electrode $E_L$, sine waves 18, 20 and 22 correspond to sine waves of electrodes $E_{M1}$, $E_{M2}$ and $E_T$, respectively. It is recognized that by phasing being provided to adjacent electrodes at about 90° with respect to each other, magnetic effects and interference are significantly reduced. It is also recognized that higher external magnetic fields direct arcs from the electrodes toward the weld pool center, which increases the puddle stability and suppresses undercutting at high speeds.

Referring to FIG. 1, the electrodes are inclined to aim the direction of the arcs toward the center of the pool. This inclination increases stability, penetration, and desired weld shape. An exemplary angle configuration is set forth in Table A.

TABLE A

| | Five-Electrode Welding Condition and Arrangement Used for Testing | | | | | |
|---|---|---|---|---|---|---|
| Electrode | Current (A) | Voltage (V) | Inclination of Electrode Θ (°) | Distance Between Electrode (mm) | Welding Speed (in/min) | Thermal Input for Welding (KJ/in) |
| $E_{DC}$ (DC) | 1600 | 32 | 75 | 20 | 125 | 74 |
| $E_L$ (AC) | 750 | 34 | 83 | 25 | | |
| $E_{M1}$ (AC) | 700 | 37 | 90 | 25 | | |
| $E_{M2}$ (AC) | 650 | 39 | 100 | 25 | | |
| $E_T$ (AC) | 650 | 40 | 125 | | | |

It is noted that the two leading electrodes are angled at less than 90° so that these lead electrodes cut a narrower groove in the base metal which is more easily filled. It is preferable that the electrode $E_{DC}$ have an inclination angle $\Theta_{23}$ between 80° and 65° to obtain the best performance with the optimum penetration obtained at 75°. It is preferable that electrode $E_L$ have an inclination angle $\Theta_{24}$ between 90° and 75°. It is also preferable that electrodes $E_{M1}$, $E_{M2}$ and $E_T$ have inclination angles $\Theta_{25}$, $\Theta_{26}$ and $\Theta_{27}$ respectively, at 90°, 100° and 125° to further suppress the undercutting tendency at high speeds by exerting forces toward the center of the weld puddle.

Three parameters in the setup of the electrodes are critical. The first is the spacing between the electrodes, the second is the phase relationship between the alternating currents electrodes, and the third is the intensity of the power applied to each electrode. It is preferable that the spacing between the electrodes, as illustrated in Table A, is between 20 to 25 millimeters. If the spacing is too close together undesirable magnetic interaction may result between adjacent electrodes. As the spacing increases the heat dissipation increases, decreasing the maximum speed achievable. At these spacing levels, it is preferable that the distance between contact tip 12 and base metal 14, measured along the electrode plane, be maintained at 1 inch.

The second factor critical in preventing arc blow is the electrical phasing between the electrodes. As previously explained, a phase relationship is selected so that a 90°±15° separation is maintained between adjacent electrodes and 180°±30° between alternate electrodes. The wiring connections to obtain these phases is illustrated in FIG. 3.

The third factor essential for preventing arc blow is the application of power to electrodes. It is critical that the difference between the power applied to each of the alternating current electrodes be less than 20%. It is recognized that by maintaining this power differential, an arc from one electrode being deflected by another electrode is minimized, thereby reducing arc blow.

Referring to FIG. 3 there is shown the wiring connections to maintain a 90° phase relationship between adjacent electrodes. Electrodes $E_L$, $E_{M1}$, $E_{M2}$ and $E_T$ are coupled to transformers 32, 34, 36 and 38 respectively, and to three phase alternating current lines 40, 42 and 44. Electrode $E_{DC}$ is coupled to DC welder transformer 46. This DC transformer 46 is also coupled to three phase lines 40-44.

Each of the electrodes $E_{DC}$, $E_L$, $E_{M1}$, $E_{M2}$ and $E_T$ are grounded through transformers 32-38 to base metal 14. DC transformer 46 is also grounded to base metal 14.

These transformers shown in FIG. 3 are generally known in the art. One such transformer is made by L-Tec, Inc. of Ashtabula, Ohio. One such electrode used is manufactured by L-Tec, Inc. of Ashtabula, Ohio.

EXAMPLE 1

Table A describes an exemplary five-electrode welding arrangement. This example is one that has been tested on a base metal with a thickness of 0.5 inches. The effect of this example was tested with magnesium oxide-based flux. The welding was effective to 125 inches per minute with the voltages, inclination angles and the distance between the electrodes, as shown in Table A.

EXAMPLE 2

Other tests were tried at different thicknesses using the parameters in Table A. Table B shows a comparison of the five-electrode welding processes, in accordance with the parameters in Table A, with the prior art four-electrode welding processes.

TABLE B

Comparison of Five Electrode Welding Process According to the Invention With the Four Electrode Welding Process

| Thickness Base Metal (inches) | Five Electrode (inches per minute) | Prior Art Four Electrode (inches per minute) |
|---|---|---|
| 1.5 | 54 (206 KJ/in) | 40 (243 KJ/in) |
| 1.0 | 82 (133 KJ/in) | 67 (142 KJ/in) |
| .5 | 125 (74 KJ/in) | 100 (91 KJ/in) |
| .375 | 132 (66 KJ/in) | 102 (102 KJ/in) |

It is recognized that at a minimum of a 20% increase has been obtained with the five-electrode process for the various thicknesses of the base metal and a decrease in the welding heat input as well.

EXAMPLE 3

The following is an exemplary process for welding metal pipes. The process steps are as follows.

First, the pipe is formed into an "O" shape using a mechanical process. After being formed, the edges of the pipe are adjacent and form a seam. The inside seam of the pipe is welded using four electrodes $IE_L$, $IE_{M1}$, $IE_{M2}$ and $IE_T$ (not shown) which are supplied with AC power while moving along the pipe. As the pipe seam is not reinforced and has no backing mechanism it is not necessary to penetrate deeply as with $E_{DC}$. The electrodes $IE_L$, $IE_{M1}$, $IE_{M2}$ and $IE_T$ are configured with similar parameters to electrodes $E_L$, $E_{M1}$, $E_{M2}$ and $E_T$ set forth in Table A with a reduced travel speed of 95 inches per minute for a 0.5 inch pipe thickness. Although 95 inches per minute is specified, this travel speed is limited by the speed at which the pipe may be moved and not the speed at which the pipe could be welded. The electrodes are then moved along the inside seam of the pipe to shape and fill the weld.

After inside welding, the pipe is welded on the outside seam. The five arc system, as previously described, is then supplied AC and DC power. The electrodes are moved along the seam on the outside of the pipe at 125 inches per minute to complete the welding process. The arc from the lead electrode $E_{DC}$ penetrates the pipe and the inside weld of the seam to provide an overlapping 100% penetration weld. The arcs produced by the alternating current electrodes $E_L$, $E_{M1}$, $E_{M2}$ and $E_T$ primarily provide the remaining necessary deposition to fill and shape the weld.

As can be seen from the above description, the five electrode submerged arc welding process improves the welding efficiency without adversely affecting the weld quality. These advantages are accomplished by employing suitable connections to the five-electrodes with both direct and alternating current sources. These connections achieve remarkable improvements at the welding speeds specified while maintaining weld quality.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method of arc welding a base metal with electrodes comprising the steps of:
   providing electrodes $E_{DC}$, $E_L$, $E_{M1}$, $E_{M2}$ and $E_T$;
   aligning the electrodes $E_{DC}$, $E_L$, $E_{M1}$, $E_{M2}$ and $E_T$ in one row from front to rear in a welding direction;
   supplying said electrode $E_{DC}$ with a direct current;

supplying said electrodes $E_L$, $E_{M1}$, $E_{M2}$ and $E_T$ with alternating current having a phase angle;

maintaining a difference in the phase angle of the alternating current supplied to adjacent electrodes $E_L$, $E_{M1}$, $E_{M2}$ and $E_T$ at $90° \pm 15°$;

maintaining a difference of the phase angle in the alternating current supplied to alternating electrodes $E_L$, $E_{M2}$, $E_{M1}$ and $E_T$ at $180° \pm 30°$; and applying power to said electrodes so that said arc from the electrode $E_{DC}$ primarily penetrates the base metal initiating a weld while the arcs from the other electrodes primarily achieve the required deposit and shape the weld.

2. A method of arc welding as recited in claim 1 further comprising the steps of:

inclining the electrode $E_{DC}$ at an angle less than 90° from the welding direction to increase weld stability; and inclining the $E_T$ at an angle of more than 110° from the welding direction to suppress undercutting.

3. The method of arc welding as recited in claim 1 further comprising the step of spacing distance between the electrodes $E_L$, $E_{M1}$, $E_{M2}$ and $E_T$ at a distance of about 25 millimeters apart.

4. An apparatus for submerged arc welding a base metal comprising:

a plurality of arc welding electrodes $E_{DC}$, $E_L$, $E_{M1}$, $E_{M2}$ and $E_T$ positioned in one row from front to rear in a welding direction;

DC means for supplying said electrode $E_{DC}$ with a direct current so that electrode $E_{DC}$ generates an arc that penetrates the base metal and initiates a weld; and AC means for supplying said electrodes $E_L$, $E_{M1}$, $E_{M2}$ and $E_T$ with alternating current with a $90° \pm 15°$ current separation between adjacent electrodes and with a $180° \pm 30°$ current separation between alternating electrodes so that the electrodes $E_L$, $E_{M1}$, $E_{M2}$ and $E_T$ generate an arc that deposits a filler and shapes the weld while electrode $E_{DC}$ generates an arc that penetrates the base metal.

5. An apparatus for submerged arc welding a base metal as recited in claim 4 wherein electrode $E_{DC}$ is angled between 65° to 85° with respect to the welding direction, and wherein electrode $E_T$ is between 110° and 135° with respect to the welding direction.

6. A method of arc welding the seam of a metal pipe, the method comprising the steps of:

aligning five electrodes $E_{DC}$, $E_L$, $E_{M1}$, $E_{M2}$ and $E_T$ in a row from front to rear in the welding direction;

positioning said electrodes adjacent the seam on the outside surface of the metal pipe;

supplying electrode $E_{DC}$ with direct current to penetrate the metal pipe;

supplying electrodes $E_L$, $E_{M1}$, $E_{M2}$ and $E_T$ with alternating current with a $90° \pm 15°$ current separation between adjacent electrodes and $180° \pm 30°$ current separation between alternating electrodes;

moving electrodes $E_{DC}$, $E_L$, $E_{M1}$, $E_{M2}$ and $E_T$ along the outside seam of the pipe in the welding direction while supplying direct current to electrode $E_{DC}$ and alternating current to electrodes $E_L$, $E_{M1}$, $E_{M2}$ and $E_T$ to weld the seam together.

aligning four electrodes $IE_L$, $IE_{M1}$, $IE_{M2}$ and $IE_T$ in a row from front to rear in a welding direction;

positioning said electrodes $IE_L$, $IE_{M1}$, $IE_{M2}$ and $IE_T$ adjacent the seam on the inside surface of the metal pipe;

moving electrodes $IE_L$, $IE_{M1}$, $IE_{M2}$ and $IE_T$ along the inside seam of the pipe in the welding direction prior to electrodes $E_{DC}$, $E_L$, $E_{M1}$, $E_{M2}$ and $E_T$ welding the outside seam together; and supplying electrodes $IE_L$, $IE_{M1}$, $IE_{M2}$ and $IE_T$ with alternating current with a $90° \pm 15°$ current separation between adjacent electrodes and $180° \pm 30°$ between alternating electrodes while moving electrodes $IE_L$, $IE_{M1}$, $IE_{M2}$ and $IE_T$ along the inside seam of the pipe.

* * * * *